(12) United States Patent
Shirai et al.

(10) Patent No.: US 7,196,240 B2
(45) Date of Patent: Mar. 27, 2007

(54) METHOD AND EQUIPMENT FOR MAKING POLYCHLOROBIPHENYL NONTOXIC

(75) Inventors: Hirofusa Shirai, 15-1, Tokida 3-chome, Ueda-shi, Nagano 386-8567 (JP); Mutsumi Kimura, Ueda (JP); Kenji Hanabusa, Ueda (JP); Kunihiro Hamada, Ueda (JP); Toshihiro Hirai, Ueda (JP)

(73) Assignees: Ueda Textile Science Foundation, Nagano (JP); Hirofusa Shirai, Nagano (JP)

( * ) Notice: Subject to any disclaimer, the term of this patent is extended or adjusted under 35 U.S.C. 154(b) by 150 days.

(21) Appl. No.: 10/487,608

(22) PCT Filed: Nov. 13, 2003

(86) PCT No.: PCT/JP03/14433

§ 371 (c)(1),
(2), (4) Date: Feb. 24, 2004

(87) PCT Pub. No.: WO2004/069341

PCT Pub. Date: Aug. 19, 2004

(65) Prior Publication Data

US 2005/0107652 A1 May 19, 2005

(30) Foreign Application Priority Data

Feb. 10, 2003 (JP) .............................. 2003-072802

(51) Int. Cl.
*A62D 3/00* (2006.01)
*B09B 3/00* (2006.01)
*F23J 15/00* (2006.01)

(52) U.S. Cl. ..................... 588/320; 588/406; 588/900; 422/184.1; 110/215

(58) Field of Classification Search ................ 588/320, 588/406, 900; 422/184.1; 110/215
See application file for complete search history.

(56) References Cited

U.S. PATENT DOCUMENTS 4,869,731 A * 9/1989 Schulz ..................... 48/197 R
4,950,309 A    8/1990 Schulz
5,074,890 A * 12/1991 Schulz ..................... 48/197 R
5,345,032 A *  9/1994 Marks et al. ............... 588/316
5,877,389 A *  3/1999 Sorokin et al. ............. 588/316

FOREIGN PATENT DOCUMENTS

| JP | A 4-370097   | 12/1992 |
| JP | A 8-141107   | 6/1996  |
| JP | A 11-37440   | 2/1999  |
| JP | A 2002-35772 | 2/2002  |
| JP | A 2002-115835| 4/2002  |
| JP | A 2002-168430| 6/2002  |

OTHER PUBLICATIONS

DERWENT Abstract accession No. 2002-323191, for JP 2002-35772, published Feb. 5, 2002.*
DERWENT Abstract accession No. 2002-610992, for JP 2002-115835, published Apr. 19, 2002.*
Full English translation of JP 2002-035772, published Feb. 5, 2002.*
Full English translation of JP 2002-115835, published Apr. 19, 2002.*

* cited by examiner

*Primary Examiner*—Steven Bos
*Assistant Examiner*—James Fiorito
(74) *Attorney, Agent, or Firm*—Oliff & Berridge, PLC

(57) ABSTRACT

Methods and equipment are provided for making polybichlorophenyl non-toxic. Methods include a first oxidation step, in which polybichlorophenyl is burned, and a second oxidation step, in which exhaust gas from the first oxidation step is oxidized by contact with metallic phthalocyanines or metallic phthalocyanine derivatives and with an oxygen supply compound. Equipment includes a first furnace for burning a polybichlorophenyl-containing oil with an auxiliary fuel and a second oxidation reaction unit. The second oxidation reaction unit connects to the first furnace under seal, and includes metallic phthalocyanine or metallic phthalocyanine derivative solution supply source and an oxygen supply compound supply source.

7 Claims, 4 Drawing Sheets

METHOD AND EQUIPMENT FOR MAKING POLYCHLOROBIPHENYL NONTOXIC

TECHNICAL FIELD

This invention relates to a method for decomposing polychlorobiphenyl, hereafter it is called PCB, to a nontoxic substance and an equipment for performing the method.

BACKGROUND ART

PCB is excellent in insulation and fire-resistant so that is used mainly as an insulating oil and a heating medium, for widespread purposes. However, since PCB is very stable chemically, it remains for a long period of time after being discharged into environment, and causes a human a bad influence. Therefore, both of production of PCB and use thereof are forbidden, and one produced in the past is kept under sealing. PCB and secondary products using it are kept so much in a depository. If PCB is kept in a long period of time, the PCB has risk of flowing out by obsolescence of the depository. So a processing for making PCB nontoxic is desired strongly.

Since it is hard to decompose, the processing for making PCB nontoxic is very difficult. But various processing methods are examined. For instance, a decomposing method of PCB by microbes is mentioned in Japanese Patent Provisional Publication No. 4-370097, and a chemical decomposing method of PCB is mentioned in Japanese Patent Provisional Publication No. 8-141107. Moreover, there is also a decomposing method of PCB by burning at high temperature.

However, these former decomposing methods of PCB have certain technical or economical problems. For instance, it is unsuitable for a mass processing since a processing speed is slow, or toxic substance is included in exhaust gas after the processing, or equipment thereof is very expensive.

Especially, since PCB comprises chlorine in molecular structure, dioxin is produced in decomposition reaction of PCB secondarily. It is well known that dioxin has toxicity, carcinogenicity and residual property. Therefore, it is considered that the processing which dioxin is contained in exhaust gas has a fatal defect.

On the other hand, an effective method for decomposing and removing dioxin is mentioned in Japanese Patent Provisional Publication No. 2002-35772 which was applied by applicants of this patent.

In the present invention, PCB is decomposed to completely nontoxic substance using the technique mentioned in Japanese Patent Provisional Publication No. 2002-35772. It is an object of the present invention to provide a processing method and equipment for PCB, which uses the simple equipment and is suitable for a quick mass processing at a low cost, and which exhaust gas emitted into atmosphere and residue dumped into natural environment are safe.

DISCLOSURE OF INVENTION

The method for making PCB nontoxic of the present invention developed for accomplishing the foregoing object, comprises steps of: a first oxidation step for oxidizing PCB by burn: a second oxidation step for oxidizing the exhaust gas produced from the first oxidation step, which may contain dioxin, by contact with metallic phthalocyanine or derivatives thereof, and an oxygen supply compound.

The metallic phthalocyanine (M-Pc) is represented by the following chemical formula (1).

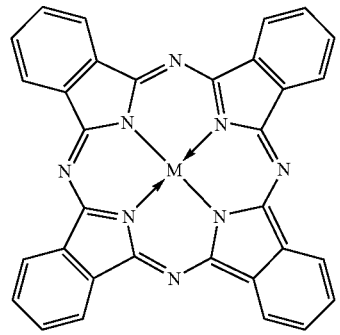

(1)

In the formula (1), metallic atom M is at least one member selected from the groups consisting of iron, cobalt, copper, nickel, manganese, osmium, titanium, molybdenum and tungsten. It is preferable that M is selected from iron, cobalt, copper and manganese.

The reaction of the first oxidation step is represented by the following chemical equations (2) and (3).

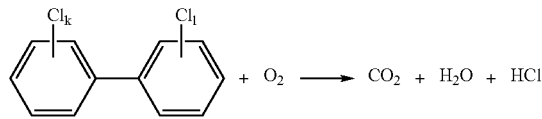

(2)

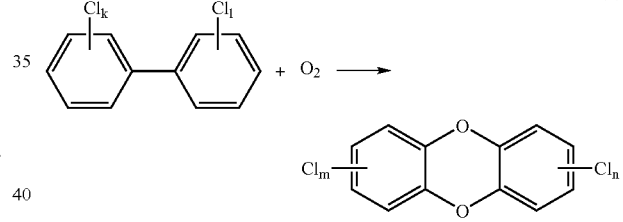

(3)

Most of PCB is decomposed to the nontoxic substance or a substance which is easy to be nontoxic by burning reaction represented by the above chemical equation (2). However, a part of the PCB is decomposed incompletely by the first oxidation step. Consequently, the dioxin is produced by the reaction represented by the above chemical equation (3) and is contaminated to the exhaust gas.

The reaction of the second oxidation step is represented by the following chemical equation (4).

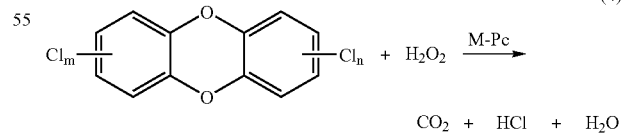

(4)

The dioxin in the exhaust gas is decomposed to the nontoxic substance or the substance which is easy to be nontoxic by the reaction represented by the above chemical equation (4).

It is preferable that the first oxidation step makes the PCB burn with an auxiliary fuel under supplying water.

It is preferable that the second oxidation step makes the exhaust gas come in contact simultaneously with a solution of the metallic phthalocyanine or the derivatives thereof and a solution of the oxygen supply compound.

It is also preferable that the second oxidation step makes the exhaust gas come in contact with the solution of the metallic phthalocyanine or the derivatives thereof and then in contact with the solution of the oxygen supply compound.

The oxygen supply compound is at least one member selected from the groups consisting of a hydrogen peroxide solution, an organic peroxide compound, a peroxosulfuric acid compound, a peroxotitanic acid and a peroxoboric acid. It is preferable that the solution of the oxygen supply compound is the hydrogen peroxide aqueous solution.

The metallic phthalocyanine derivative(M-Pc) used for the solution is represented by the following chemical formula (5).

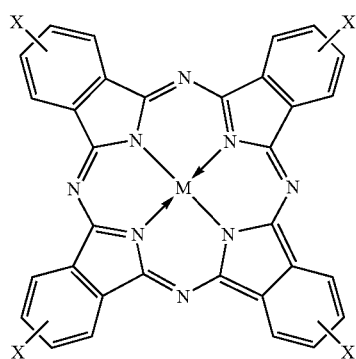

(5)

In the chemical formula (5), the metallic atom M is the same as that of the chemical formula (1). Substituents X are selected from the groups consisting of a hydrogen atom, a carboxyl group, a sulfonic acid group, an alkyl group, a substituted alkyl group, a halogen group, a nitro group, an amino group, a thiocyanate group, a carbonylchloride group, an aldehyde group, a carboxylamide group, a nitrile group, a hydroxyl group, an alkoxyl group, a phenoxyl group, sulfonylchloride group, a sulfonamide group, a thiol group, a chloromethyl group, an alkylsilicon group, a vinyl group, a sulfonate salt and a carboxylate salt. These substituents X are same or different to each other.

It is preferable that the metallic phthalocyanine derivative is a metallic phthalocyanine polycarboxylic acid or a metallic phthalocyanine polysulfonic acid, which at least two of these substituents X are the carboxyl group or the sulfonic acid group respectively. It is much preferable that the metallic phthalocyanine derivative is a metallic phthalocyanine tetracarboxylic acid or a metallic phthalocyanine octacarboxylic acid, which four or eight of these substituents X in the chemical formula (5) are the carboxyl group.

It is the most preferable that the solution of the metallic phthalocyanine derivative is an iron phthalocyanine tetracarboxylic acid aqueous solution or an iron phthalocyanine octacarboxylic acid aqueous solution. It is preferable that the solution of the oxygen supply compound is the hydrogen peroxide aqueous solution.

It is preferable that the concentration of the solution of the metallic phthalocyanine derivative is ranging $10^{-5}$ to $10^{-2}$ Mol/L to make the dioxin in the exhaust gas come in contact with the solution of the metallic phthalocyanine derivatives reasonably. The metallic phthalocyanine derivative acts as an oxidation catalyst. If a supply of the metallic phthalocyanine derivative is less than the above range, a sufficient catalytic effect such as a quick reaction rate cannot be achieved. If the supply of the metallic phthalocyanine derivative is more than the above range, the catalytic effect is saturated and it is meaningless.

It is preferable that the concentration of the hydrogen peroxide aqueous solution is ranging $10^{-3}$ to 10 Mol/L to make the dioxin in the exhaust gas come in contact with the hydrogen peroxide aqueous solution reasonably. It is preferable that the supply of the hydrogen peroxide aqueous solution, which is pure amount thereof, is ten times larger than the amount of the dioxin in the Q4 exhaust gas. If the supply of the hydrogen peroxide aqueous solution is less than the above range, the dioxin will remain in the exhaust gas because of insufficiency of the amount of the oxygen. If the supply of the hydrogen peroxide aqueous solution is more than the above range, it is an excessive and meaningless economically.

The equipment for making PCB nontoxic of the present invention developed for accomplishing the foregoing object similarly, comprises: a first burn furnace for burning an oil containing PCB with the auxiliary fuel: a second oxidation reaction unit, connecting to the first burn furnace under sealing, comprising a supply source of the solution of the metallic phthalocyanine derivatives and a supply source of the solution of the oxygen supply compound.

It is preferable that the second oxidation reaction unit further connects to a neutralization reaction unit (see FIG. 2) opening to outside.

DETAILED EXPLANATION OF THE INVENTION

Hereunder, embodiments of this invention are explained in detail referring to the figures.

Figure 1:
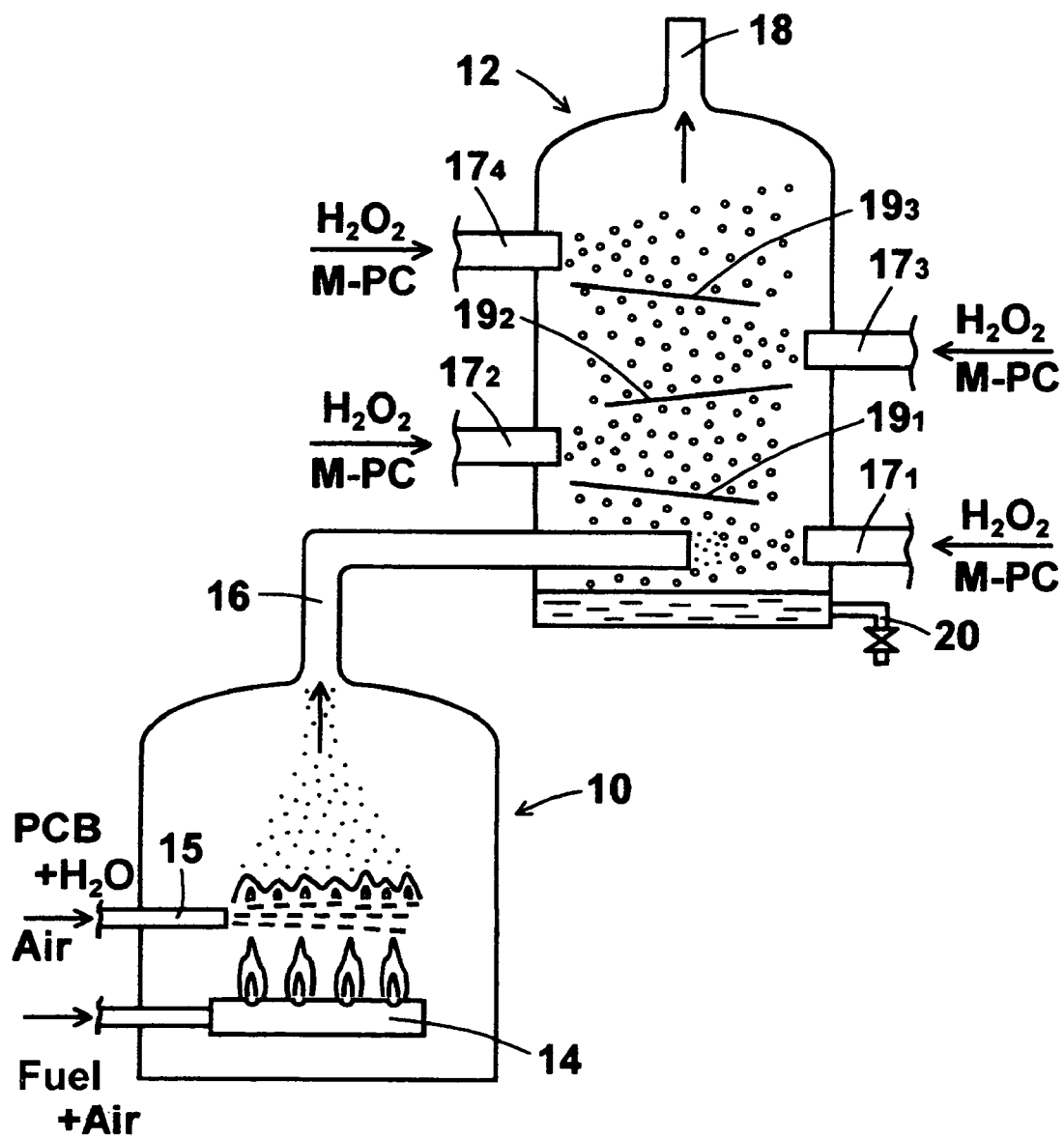
FIG. 1 is a constitution diagram in outline showing one example of the equipment for making the polychlorobiphenyl nontoxic of the present invention.

FIG. 1 is the constitution diagram in outline showing one example of the equipment for making the PCB nontoxic of the present invention. This equipment is comprised of the first burn furnace 10 and the second oxidation reaction unit 12, and further the neutralization reaction unit 13 shown in FIG. 2 is connected.

The first burn furnace 10 is under sealing and has a main burner 15 above an auxiliary burner 14. The auxiliary burner 14 is connected to a supply source of a heavy oil as the auxiliary fuel, which is mixed with air. The main burner 15 is connected to a supply source of a mixed suspension of the water and the oil containing the PCB. The mixed suspension is sprayed from the main burner 15 with air. The first burn furnace 10 has a first exhaust pipe 16 at the top end thereof.

The second oxidation reaction unit 12 is also a column under sealing and a bottom thereof is a waste liquid collector. The second oxidation reaction unit 12 has the first exhaust pipe 16, the spray spouts $17_1$, $17_2$, $17_3$, $17_4$ of the oxidizing agent from the bottom in that order, and has a second exhaust pipe 18 at the top end thereof. Each spray spout $17_1$, $17_2$, $17_3$, $17_4$ of the oxidizing agent connects to the supply source of the metallic phthalocyanine derivatives aqueous solution and the oxygen supply compound aqueous solution. Sloping dam baffles $19_1$, $19_2$, $19_3$ are set between each spray spout of the oxidizing agent. A drain 20 is attached to the waste liquid collector.

Figure 2:
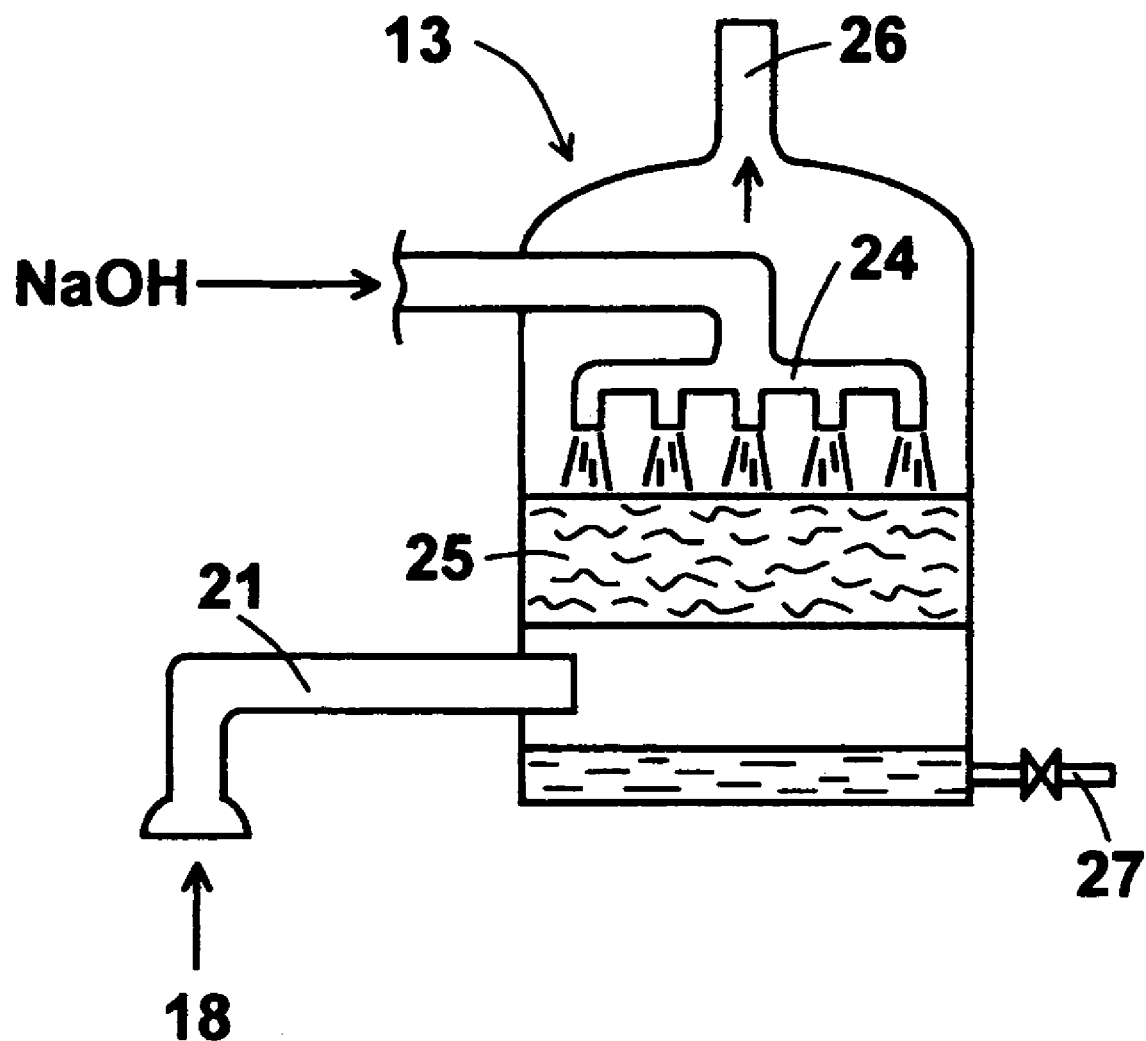
FIG. 2 is a constitution diagram in outline showing one example of the neutralization reaction unit connected to the equipment for making the polychlorobiphenyl nontoxic of the present invention.

As shown in FIG. 2, the second exhaust pipe 18 of the second oxidation reaction unit 12 is connected to an inhalation pipe 21 of the neutralization reaction unit 13. The bottom of the neutralization reaction unit 13 is the waste liquid collector and the drain 27 is attached thereto. In the neutralization reaction unit 13, a layer of a glass wool as a filter 25 is set, a shower 24 for a caustic soda aqueous solution is attached above the layer, and a final exhaust pipe 26 at the top end of the neutralization reaction unit 13 is opened to atmosphere.

Hereunder, embodiments of the method for making the PCB nontoxic of this invention using the equipment for making the PCB nontoxic shown in FIG. 1 and FIG. 2 are explained.

A mixture of the heavy oil and the air is fired with the auxiliary burner 14. On the other hand, a mixture of the PCB oil and the water is sprayed under mixing with air by the main burner 15. Then the PCB oil is oxidized by the burning heat of the heavy oil from the auxiliary burner 14, and decomposed to the water, carbonic acid gas and hydrogen chloride. They escape to the first exhaust pipe 16. The water mixing in the PCB oil is decomposed to hydrogen and oxygen simultaneously with this burning, and then oxyhydrogen flame is produced. The high temperature by this oxyhydrogen flame makes a decomposition efficiency high. However, a part of the PCB is oxidized only to the dioxin, so the dioxin, which is low concentration, escapes to the first exhaust pipe 16.

The water, the carbonic acid gas, the hydrogen chloride and the slight amount of the dioxin enter the second oxidation reaction unit 12 through the first exhaust pipe 16. In the second oxidation reaction unit 12, a mist of the metallic phthalocyanine derivative aqueous solution and the hydrogen peroxide aqueous solution, which is sprayed from the spray spouts $17_1$, $17_2$, $17_3$, $17_4$ of the oxidizing agent, fills. The dioxin comes in contact simultaneously with the metallic phthalocyanine derivatives and the hydrogen peroxide aqueous solution in the second oxidation reaction unit 12. The dioxin rides on an ascending stream with the residual burning heat from the first exhaust pipe 16. The contact probability to the metallic phthalocyanine derivative aqueous solution and the hydrogen peroxide aqueous solution is raised because the dioxin snakes its way by the dam baffles $19_1$, $19_2$, $19_3$. Then the dioxin is oxidized by an oxygen supply ability of the hydrogen peroxide aqueous solution and an oxidation catalyst ability of high speed reaction, which is a characteristic of the metallic phthalocyanine derivatives as an artificial enzyme, and decomposed almost completely to the water, the carbonic acid gas and the hydrogen chloride. The water, carbonic acid gas and hydrogen chloride produced in the second oxidation reaction unit 12 escape to the second exhaust pipe 18 with the water, the carbonic acid gas and the hydrogen chloride entered through the first exhaust pipe 16 and further with moisture of the metallic phthalocyanine derivative aqueous solution and the hydrogen peroxide aqueous solution. A part of moisture drops into the waste liquid collector of the bottom to store. The hydrogen chloride makes pH of the metallic phthalocyanine derivative aqueous solution low, so the metallic phthalocyanine derivative deposits and falls in the waste liquid collector, and then precipitates. The precipitated metallic phthalocyanine derivative can be reused by recovery thereof.

The water, the carbonic acid gas and the hydrogen chloride, which escape to the second exhaust pipe 18, enter the neutralization reaction unit 13 through the inhalation pipe 21. They are captured and neutralized by the caustic soda aqueous solution which is supplied from the shower 24 and permeates into the filter 25. Most moisture is stored in the waste liquid collector, so it can be recovered from the drain 27 to treat drainage safely. The water and the carbonic acid gas escape into the atmosphere through the final exhaust pipe 26.

Figure 3:
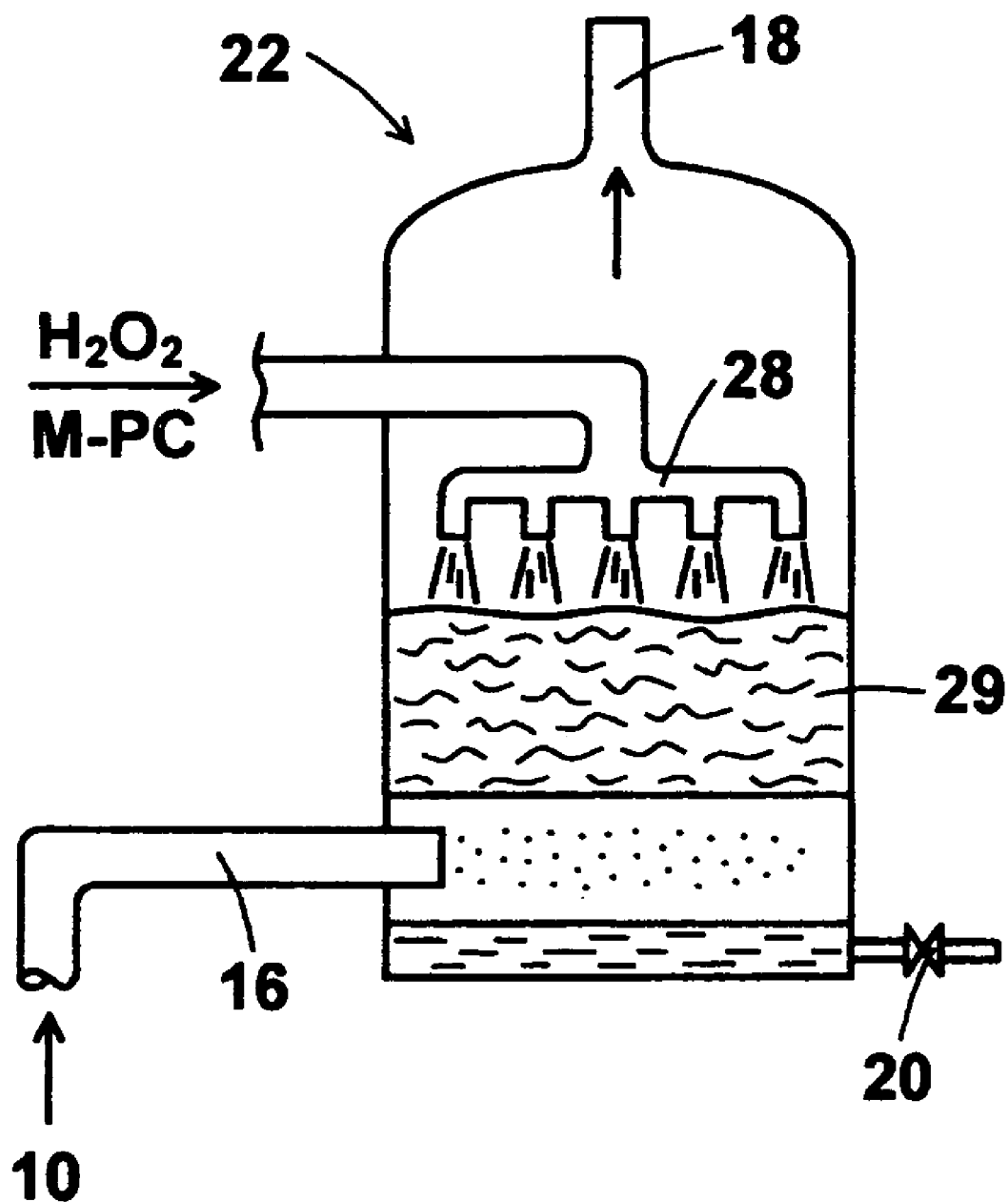
FIG. 3 is a constitution diagram in outline showing another example of the oxidation reaction unit.

FIG. 3 shows the second oxidation reaction unit 22 used for the equipment for making the PCB nontoxic of the present invention, which is another example taking the place of the second oxidation reaction unit 12 shown in FIG. 1. The second oxidation reaction unit 22 is connected with the first burn furnace 10 through the first exhaust pipe 16. The bottom thereof is the waste liquid collector which the drain 20 is attached. The filter 29 comprised of a layer of a noncombustible fiber is set at the central part of the second oxidation reaction unit 22, and the shower 28 for the metallic phthalocyanine derivative aqueous solution and the hydrogen peroxide aqueous solution is attached above it.

When the exhaust gas containing the dioxin entered the second oxidation reaction unit 22 from the first exhaust pipe 16 passes through the filter 29, the dioxin is oxidized by coming in contact with the metallic phthalocyanine derivatives and the solution of the hydrogen peroxide permeating by the shower 28, and decomposed almost completely to the water, the carbonic acid gas and the hydrogen chloride. The produced water, carbonic acid gas and hydrogen chloride escape to the second exhaust pipe 18. A part of moisture drops into the waste liquid collector of the bottom to store.

Figure 4:
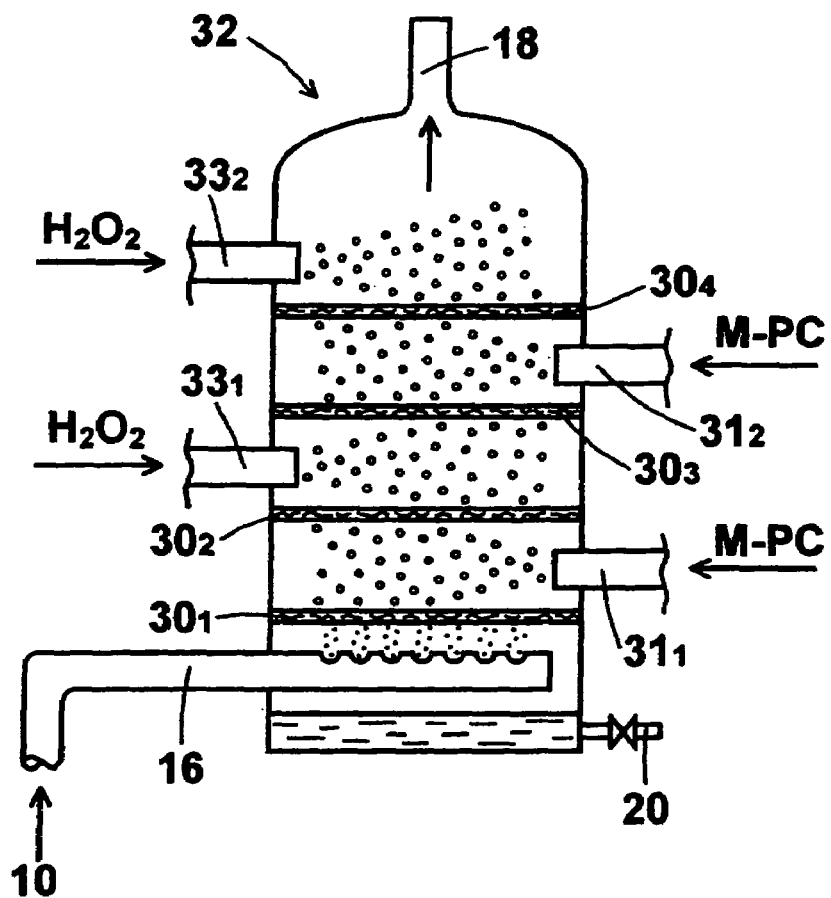
FIG. 4 is a constitution diagram in outline showing another example of the oxidation reaction unit.

FIG. 4 also shows the second oxidation reaction unit 32 used for the equipment for making the PCB nontoxic of the present invention, which is another example taking the place of the second oxidation reaction unit 12 shown in FIG. 1. The second oxidation reaction unit 32 is connected with the first burn furnace 10 through the first exhaust pipe 16. The bottom thereof is the waste liquid collector which the drain 20 is attached. The filters $30_1$, $30_2$, $30_3$, $30_4$ comprised of the layer of the noncombustible fiber are set at the central part of the second oxidation reaction unit 32. The spray spouts $31_1$ and $31_2$ of the metallic phthalocyanine derivative aqueous solution are attached between the filters $30_1$ and $30_2$ and between the filters $30_3$ and $30_4$ respectively. The spray spouts $33_1$ and $33_2$ of the hydrogen peroxide aqueous solution are attached between the filters $30_2$ and $30_3$ and above the filter $30_4$ respectively.

When the exhaust gas containing the dioxin entered the second oxidation reaction unit 32 from the first exhaust pipe 16 passes between the filters $30_1$ and $30_2$, it comes in contact with the metallic phthalocyanine derivative. When the gas passes between the filters $30_2$ and $30_3$, it comes in contact with the solution of the hydrogen peroxide. Consequently, the dioxin is oxidized promptly. Furthermore, when the gas passes between the filters $30_3$ and $30_4$, it comes in contact with the metallic phthalocyanine derivative. After the gas passes through the filter $30_4$, it comes in contact with the solution of the hydrogen peroxide. Consequently, the dioxin is oxidized and decomposed completely.

Figure 5:
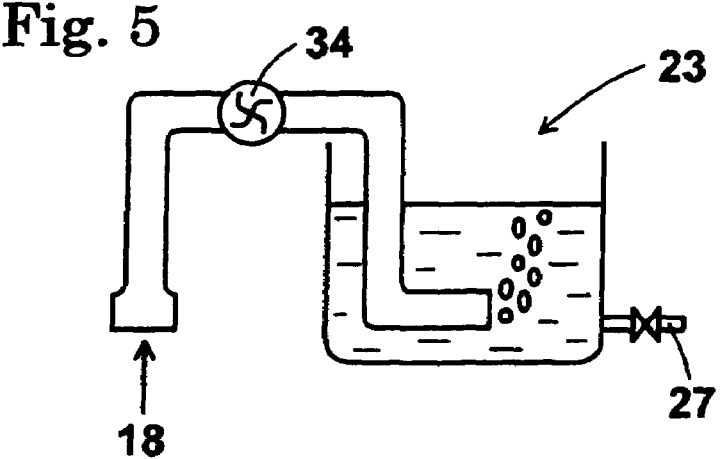
FIG. 5 is a constitution diagram in outline showing another example of the neutralization reaction unit.

FIG. 5 shows another example of the neutralization reaction unit. In the neutralization reaction unit 23, the exhaust gas containing the hydrogen chloride from the second exhaust pipe 18 is bubbled into the alkaline aqueous solution using a fan 34. The hydrogen chloride is captured and neutralized, and then recovered from the drain 27.

Hereunder, experimental examples of the method for making the PCB nontoxic of this invention are explained. It is impossible to experiment using the PCB itself because the PCB is kept under sealing as above mentioned. Therefore, the dioxin produced by burning the other chlorine compounds was used for the experiment as the dioxin produced by burning the PCB.

(The Production Experiment of the Dioxin)

As the compound which a lot of dioxin is contained in the burned exhaust gas, 75 weight % of vinyl chloride, 15 weight % of various plastics, 4 weight % of refuse derived fuel, 3 weight % of chloroform and 3 weight % of chlorobenzene are mixed and supplied to the main burner of a small experimental furnace imitating the first burn furnace 10 shown in FIG. 1, and then burned using the heavy oil as the auxiliary fuel. Quantity of the dioxin in the exhaust gas produced by burning was 4000 to 6000 ng/Nm$^3$, which shows a weight per cubic meter at standard conditions of 0 degree centigrade and one atmospheric pressure.

Experiment 1

(Q1)0.04% aqueous solution of iron phthalocyanine octacarboxylic acid as the metallic phthalocyanine derivative aqueous solution and (Q3)0.1% aqueous solution of hydrogen peroxide as the oxidizing agent are sprayed in a small experimental reactor imitating the second oxidation reaction unit 12 shown in FIG. 1 in order to fill the reactor with the mist thereof. The exhaust gas produced by above production experiment of the dioxin was introduced into the reactor under this condition. Quantity of the dioxin in the gas exhausted from the exhaust exit of the experimental reactor immediately was 1 ng/Nm$^3$.

Experiment 2

Quantity of the dioxin in the gas exhausted from the exhaust exit of the experimental reactor was measured as the same as Experiment 1, except for using 0.02% aqueous solution of iron phthalocyanine tetracarboxylic acid as the metallic phthalocyanine derivative aqueous solution. Quantity of the dioxin was 4 ng/Nm$^3$.

Experiment 3

Quantity of the dioxin in the gas exhausted from the exhaust exit of the experimental reactor was measured as the same as Experiment 1, except for using 0.02% aqueous solution of manganese phthalocyanine disulfonic acid as the metallic phthalocyanine derivative aqueous solution. Quantity of the dioxin was 0.5 ng/Nm$^3$.

Each quantity of the dioxin produced by the Experiments 1 to 3 is much less than a regulation quantity of the dioxin in the exhaust gas exhausted from the burn furnace etc. at present, which is 5 ng/Nm$^3$.

The above result was obtained by using the high concentration dioxin contained in the exhaust gas from the first burn furnace, which is 4000 to 6000 ng/Nm$^3$. There is a data of the past experiment that the dioxin is produced about 10 ng/Nm$^3$ when the PCB is burned. Therefore, it may be possible to reduce the quantity of the dioxin to the 0.1 ng/Nm$^3$ of a detection limit if the quantity of the dioxin is such level.

INDUSTRIAL APPLICABILITY

As it is mentioned above in detail, PCB can be decomposed to the nontoxic substance quickly and efficiently by using the method of the present invention. The problems of former methods, for instance, dioxin is included in the exhaust gas or the residue, or the decomposition processing takes a long time, were solved completely.

Furthermore, the equipment for making PCB nontoxic of the present invention can carry out the method of the present invention efficiently in spite of the simple equipment.

What is claimed is:

1. A method for making polychlorobiphenyl nontoxic comprising steps of:
    burning to oxidize the polychlorobiphenyl and thereby producing an exhaust gas that may contain dioxin;
    contacting said exhaust gas with metallic phthalocyanine or derivatives thereof; and
    subsequently oxidizing said exhaust gas that has been contacted with metallic phthalocyanine or derivatives thereof by contacting with an oxygen supply compound.

2. The method for making polychlorobiphenyl nontoxic according to claim 1, wherein said burning to oxidize the polychlorobiphenyl comprises burning the polychlorobiphenyl with an auxiliary fuel under supplying water.

3. The method for making polychlorobiphenyl nontoxic according to claim 1, wherein said oxygen supply compound is selected from the group consisting of a hydrogen peroxide solution, an organic peroxide compound, a peroxosulfuric acid compound, a peroxotitanic acid and a peroxoboric acid.

4. The method for making polychlorobiphenyl nontoxic according to claim 1, wherein said metallic phthalocyanine derivative is represented by the following chemical formula (5),

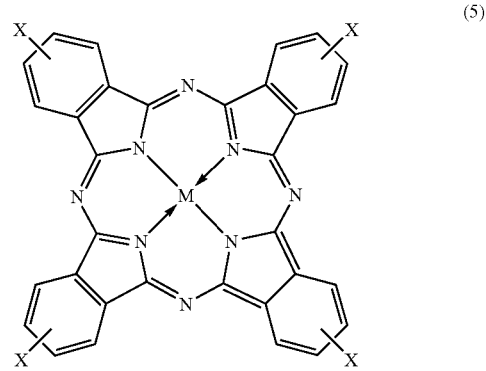

in which M is one or more metals chosen from the group consisting of iron, cobalt, copper, nickel, manganese, osmium, titanium, molybdenum and tungsten; and at least two of X in the chemical formula (5) are a carboxyl group or a sulfonic acid group.

5. The method for making polychlorobiphenyl nontoxic according to claim 1, wherein the oxygen supply compound is a hydrogen peroxide aqueous solution having a concentration of $10^{-3}$ to 10 Mol/L.

6. An apparatus for making polychlorobiphenyl nontoxic comprising:
   a first furnace for burning an oil containing the polychlorobiphenyl with an auxiliary fuel;
   a second oxidation reaction unit, connecting to the first furnace under sealing, comprising filters, supply sources of a solution of metallic phthalocyanine derivatives and supply sources of an oxygen supply compound, wherein the filters are located between the supply sources of the oxygen supply compound and the supply sources of the solution of the metallic phthalocyanine derivatives.

7. The apparatus for making polychlorobiphenyl nontoxic according to claim 6, wherein said second oxidation reaction unit further connects to a neutralization reaction unit opening to outside.

* * * * *